United States Patent
Hitchcock (10) Patent No.: US 10,710,535 B2
(45) Date of Patent: Jul. 14, 2020

(54) REAR IMPACT GUARD FOR A TANK TRAILER

(71) Applicant: Wabash National, L.P., Lafayette, IN (US)

(72) Inventor: Thomas J. Hitchcock, Oshkosh, WI (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 16/115,245

(22) Filed: Aug. 28, 2018

(65) Prior Publication Data

US 2019/0061660 A1 Feb. 28, 2019

Related U.S. Application Data

(60) Provisional application No. 62/551,397, filed on Aug. 29, 2017.

(51) Int. Cl.
| | | |
|---|---|---|
| *B60R 19/56* | (2006.01) | |
| *B60R 19/02* | (2006.01) | |
| *B60R 19/24* | (2006.01) | |

(52) U.S. Cl.
CPC ............ *B60R 19/56* (2013.01); *B60R 19/023* (2013.01); *B60R 19/24* (2013.01)

(58) Field of Classification Search
CPC ........ B60R 19/56; B60R 19/023; B60R 19/24
See application file for complete search history.

(56) References Cited

U.S. PATENT DOCUMENTS

| | | |
|---|---|---|
| 1,855,977 A | 4/1932 | Llobet |
| 3,533,654 A | 10/1970 | Kannegieter |
| 3,720,333 A | 3/1973 | Vaughn |
| 3,871,695 A | 3/1975 | Koenig |
| 3,913,963 A | 10/1975 | Persicke |
| 3,923,330 A | 12/1975 | Viall, Sr. et al. |
| 4,026,590 A | 5/1977 | Holm |
| 4,105,237 A | 8/1978 | Viall, Sr. et al. |

(Continued)

FOREIGN PATENT DOCUMENTS

| | | |
|---|---|---|
| DE | 1280695 B | 10/1968 |
| DE | 9311893 U1 | 12/1993 |

(Continued)

*Primary Examiner* — Jason S Morrow
(74) *Attorney, Agent, or Firm* — Quarles & Brady LLP (57) ABSTRACT

According to some aspects of the invention, a rear impact guard is configured to be coupled to a rear end of a vehicle. The rear impact guard includes first and second bumper support members configured to be coupled to first and second base rails of the vehicle. The first and second bumper support members are spaced from one another along a width of the vehicle. A horizontal bumper is mounted to lower ends of the first and second bumper support members. First and second angled support members are coupled at first ends to the first and second bumper support members, and coupled at second ends to the first and second base rails forwardly of the first and second bumper support members and forming a substantially hollow triangular member. First and second braces are positioned within the first and second base rails and coupled thereto. At least a portion of each of the first and second braces is located above the second ends of the first and second angled supports.

20 Claims, 4 Drawing Sheets

(56) References Cited

U.S. PATENT DOCUMENTS

| | | | |
|---|---|---|---|
| 4,247,138 | A | 1/1981 | Child |
| 4,359,239 | A | 11/1982 | Eggert, Jr. |
| 4,410,207 | A | 10/1983 | Scharf |
| 4,514,002 | A | 4/1985 | McIntosh |
| 4,516,902 | A | 5/1985 | Matson |
| 4,541,661 | A | 9/1985 | Hawk |
| 4,641,871 | A | 2/1987 | Vaughn |
| 4,979,770 | A | 12/1990 | Shal-Bar |
| 4,988,258 | A | 1/1991 | Lutz et al. |
| 4,991,681 | A | 2/1991 | Paulson |
| 5,360,311 | A | 11/1994 | Lutz et al. |
| 5,520,428 | A | 5/1996 | Bell |
| 5,632,518 | A | 5/1997 | Kendall |
| 5,673,953 | A | 10/1997 | Spease |
| 6,089,629 | A | 7/2000 | Hope et al. |
| 6,116,667 | A | 9/2000 | Torcomian |
| 6,176,529 | B1 | 1/2001 | Kitzmiller et al. |
| 6,176,530 | B1 | 1/2001 | Gollungberg |
| 6,183,025 | B1 | 2/2001 | Hope et al. |
| 6,652,010 | B1 | 11/2003 | Huddle et al. |
| 6,764,116 | B2 | 7/2004 | Ledford et al. |
| 6,799,783 | B2 | 10/2004 | Gollungberg et al. |
| 6,837,536 | B1 | 1/2005 | Schwartz |
| 6,962,378 | B2 | 11/2005 | Ledford et al. |
| 6,974,166 | B2 | 12/2005 | Ledford et al. |
| 7,086,674 | B2 | 8/2006 | Goertz |
| 7,216,904 | B2 | 5/2007 | Thomas |
| 7,399,015 | B2 | 7/2008 | Patel et al. |
| 7,527,309 | B2 | 5/2009 | Smidler |
| 7,530,612 | B2 | 5/2009 | Regnell et al. |
| 7,766,403 | B2 | 8/2010 | Alvarsson et al. |
| 7,810,870 | B2 | 10/2010 | Shepard et al. |
| 7,900,983 | B2 | 3/2011 | Saitou |
| 7,950,705 | B2 | 5/2011 | Saitou |
| 7,967,349 | B2 | 6/2011 | Puppini et al. |
| 8,100,465 | B2 | 1/2012 | Wylezinski |
| 8,562,019 | B2 | 10/2013 | Ehrlich |
| 8,950,793 | B2 | 2/2015 | Deighton |
| D728,447 | S | 5/2015 | Bobba |
| 9,199,594 | B2 | 12/2015 | Musale et al. |
| 9,308,881 | B2 | 4/2016 | Bobba |
| 9,403,499 | B2 | 8/2016 | Hicks |
| 9,463,759 | B1 | 10/2016 | Kiefer |
| D790,407 | S | 6/2017 | Miller et al. |
| 9,771,040 | B2 | 9/2017 | Miller et al. |
| 9,783,144 | B2 | 10/2017 | Miller et al. |
| 2005/0116435 | A1 | 6/2005 | Nishiura et al. |
| 2006/0119116 | A1* | 6/2006 | Goertz ................ B60R 19/56 293/132 |
| 2007/0046041 | A1 | 3/2007 | Thomas |
| 2008/0073921 | A1 | 3/2008 | Smidler |
| 2008/0073941 | A1 | 3/2008 | Wylezinski |
| 2009/0001682 | A1 | 1/2009 | Yamashita et al. |
| 2010/0202150 | A1 | 8/2010 | Adams |
| 2011/0291385 | A1 | 12/2011 | Dorsey et al. |
| 2013/0249223 | A1 | 9/2013 | Deighton |
| 2015/0076846 | A1* | 3/2015 | Musale ................ B60R 19/56 293/133 |
| 2015/0258951 | A1 | 9/2015 | Wylezinski et al. |
| 2017/0050596 | A1 | 2/2017 | Miller et al. |
| 2017/0072886 | A1 | 3/2017 | Wylezinski et al. |
| 2017/0101070 | A1 | 4/2017 | Wylezinski et al. |
| 2017/0240217 | A1 | 8/2017 | Storz et al. |
| 2018/0244227 | A1* | 8/2018 | Miller ................ B60R 19/56 |
| 2018/0334122 | A1* | 11/2018 | Wylezinski ............ B60R 19/56 |

FOREIGN PATENT DOCUMENTS

| | | | |
|---|---|---|---|
| DE | 19643049 | A1 | 4/1998 |
| DE | 19643049 | C2 | 5/2000 |
| DE | 102007001111 | A1 | 7/2008 |
| EP | 1600335 | A2 | 11/2005 |
| EP | 2845772 | A1 | 3/2015 |
| WO | 2013002010 | A1 | 1/2013 |
| WO | 2012087101 | A3 | 5/2016 |

* cited by examiner

REAR IMPACT GUARD FOR A TANK TRAILER

CROSS-REFERENCE TO RELATED APPLICATIONS

This application claims priority under 35 U.S.C. § 119 to U.S. Provisional Patent Application No. 62/551,397, filed Aug. 29, 2017, entitled "Rear Impact Guard for a Tank Trailer," the entire contents of which are incorporated herein by reference for all purposes.

FIELD OF THE DISCLOSURE

The present disclosure relates generally tank trailers. In particular, the present disclosure relates to a rear impact guard for a tank trailer and other vehicles.

BACKGROUND

The rear impact guard of a trailer, semi-trailer, tank trailer, and/or flatbed trailer is generally provided to help prevent other vehicles in a rear-impact collision with such a trailer from traveling beyond the rear extremity of the trailer and into an area beneath a floor assembly of the trailer. Rear impact guards may also operate to absorb the energy of a rear impact from another vehicle. Rear impact guards typically include a horizontal member suspended from two struts coupled to a bottom side of the trailer.

The present disclosure may comprise one or more of the features recited in the attached claims, and/or one or more of the following features and combinations thereof.

According to some aspects of the invention, a rear impact guard is configured to be coupled to a rear end of a vehicle. The rear impact guard includes first and second bumper support members configured to be coupled to first and second base rails of the vehicle. The first and second bumper support members are spaced from one another along a width of the vehicle. A horizontal bumper is mounted to lower ends of the first and second bumper support members. First and second angled support members are coupled at first ends to the first and second bumper support members, and coupled at second ends to the first and second base rails forwardly of the first and second bumper support members and forming a substantially hollow triangular member. First and second braces are positioned within the first and second base rails and coupled thereto. At least a portion of each of the first and second braces is located above the second ends of the first and second angled supports.

According to another illustrative aspect, a kit for retrofitting a vehicle is provided. The kit includes various components of a rear impact guard configured to be coupled to frame adjacent a rear end of a vehicle and includes first and second bumper support members designed to be coupled to first and second base rails of the vehicle. A horizontal bumper is optionally included and is designed to be mounted to lower ends of the first and second bumper support members. At least two angled support members are designed to be coupled at first ends to each of the first and second bumper support members, respectively. The at least two angled support members are designed to be coupled at second ends to each of the first and second base rails, respectively. The first and second bumper support members and the at least two angled support members define a substantially triangular body with an opening therein. The kit further includes a plurality of braces designed to be positioned within the first and second base rails and coupled thereto. At least a portion of the plurality of braces is located above the second ends of the two angled support members.

In another illustrative aspect, a method of retrofitting a rear impact guard coupled to a rear end of a vehicle is disclosed. The vehicle includes first and second bumper support members configured to be coupled to first and second base rails of the vehicle and a horizontal bumper mounted to lower ends of the first and second bumper support members. The method includes the steps of coupling first ends of first and second angled support members to the first and second bumper support members, respectively, and coupling second ends of first and second angled support members to the first and second base rails of the vehicle to form a triangular support having an opening therein, and coupling first and second braces to the first and second base rails, wherein at least a portion of each of the first and second braces is located above the second ends of respective angled supports.

DETAILED DESCRIPTION

For the purposes of promoting an understanding of the principles of the disclosure, reference will now be made to example embodiments shown in the attached drawings and specific language will be used to describe the same. Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with single or multiple instances of A, B, and/or C. Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, the term "cylindrical" is used to refer to containers that have generally rounded interior walls. As such, for example, a cylindrical mobile cargo tank can exhibit a fully circular cross-section, an oval (e.g., elliptical) cross section, or other similar cross-sections. Further, unless otherwise specified or limited, a "cylindrical" container need not necessarily exhibit a constant cross-sectional profile. As such, for example, some cylindrical tanks can include conical portions or other varying geometry.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For the purposes of promoting an understanding of the principles of the disclosure, reference will now be made to a number of illustrative embodiments illustrated in the drawings and specific language will be used to describe the same.

While the concepts of this disclosure are described in relation to a tank trailer, it will be understood that the concepts are equally applicable to other vehicles generally, and more specifically to any other trailer having a frame similar to that of tank trailers and/or other suitable vehicles, examples of which include, but should not be limited to, straight truck bodies, small personal, and/or commercial trailers and the like. Accordingly, those skilled in the art will appreciate that the present disclosure may be implemented in a number of different applications and embodiments and is not specifically limited in its application to the particular embodiments depicted herein.

Figure 1:
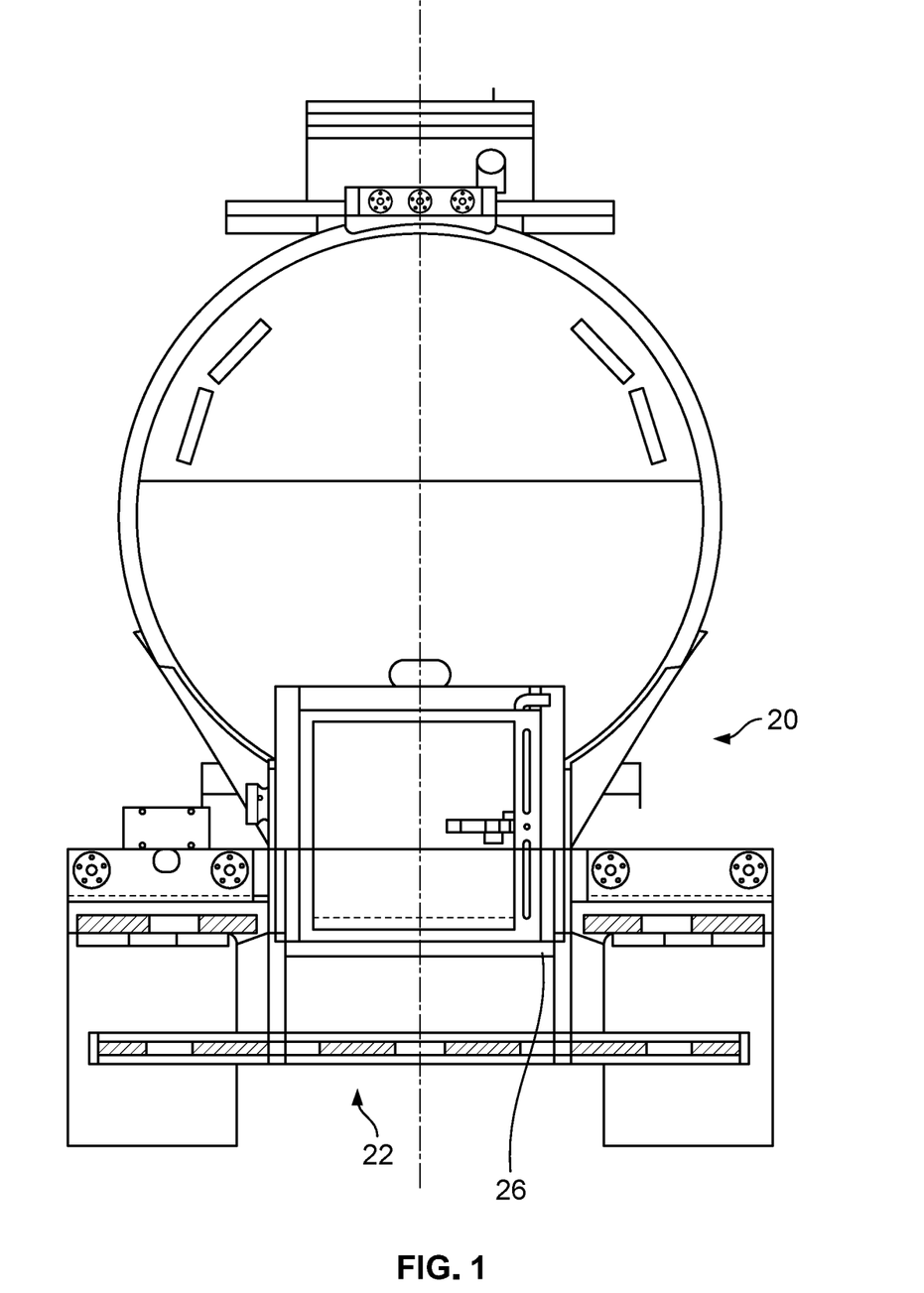
FIG. 1 is a rear elevational view of a trailer, for example, a tank trailer, that may implement any of the rear impact guards with support systems disclosed herein.
Figure 2:
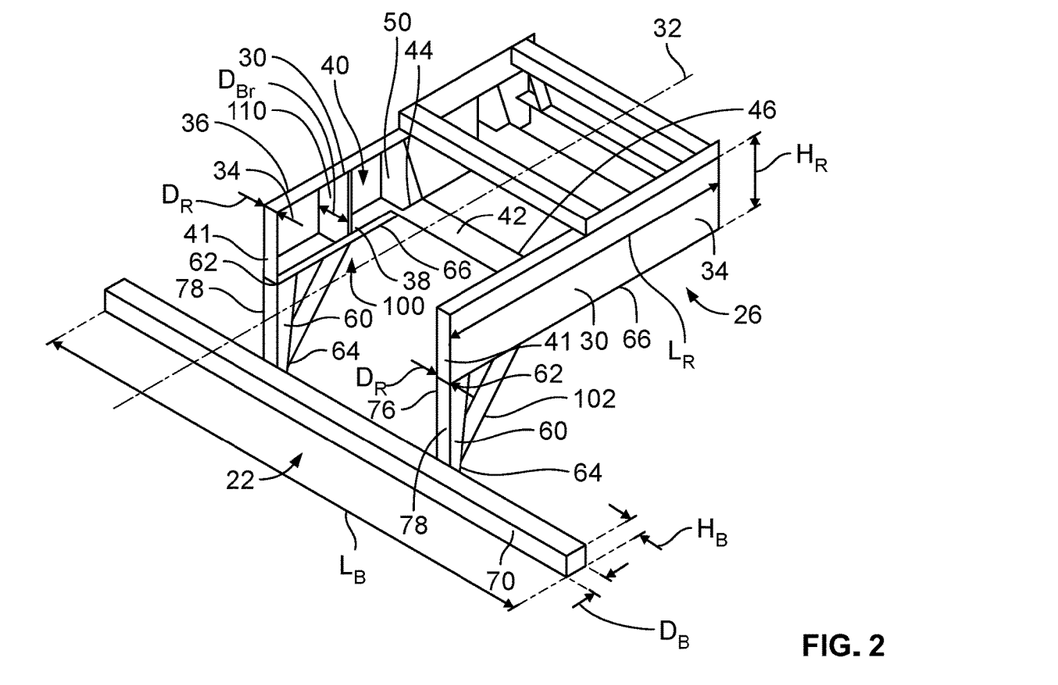
FIG. 2 is a top isometric view of a trailer frame of, for example, the tank trailer of FIG. 1 with a first embodiment of a rear impact guard with support system coupled thereto.

Referring to FIG. 1 and FIG. 2, a trailer 20 having a cylindrical tank includes an embodiment of a rear impact guard 22, also known as a rear impact guard assembly, coupled to and depending downwardly from rear, bottom surfaces 66 of base rails 30 coupled to a trailer frame 26. The rear impact guard 22 may be formed as a separate unit from the trailer 20 and may be secured onto the trailer frame 26 after assembly. The rear impact guard 22 may be secured onto the trailer frame 26 in manners known in the art including welding, fasteners, and other methodologies. The rear impact guard 22 is attached to the trailer 20 adjacent a rear end of the trailer 20 and extends downwardly between two opposing wheel assemblies. In some instances, the width of the rear impact guard 22 protrudes outwardly further than the width of the cylindrical tank, but does not extend as far as the entire width of the trailer 20.

Figure 3:
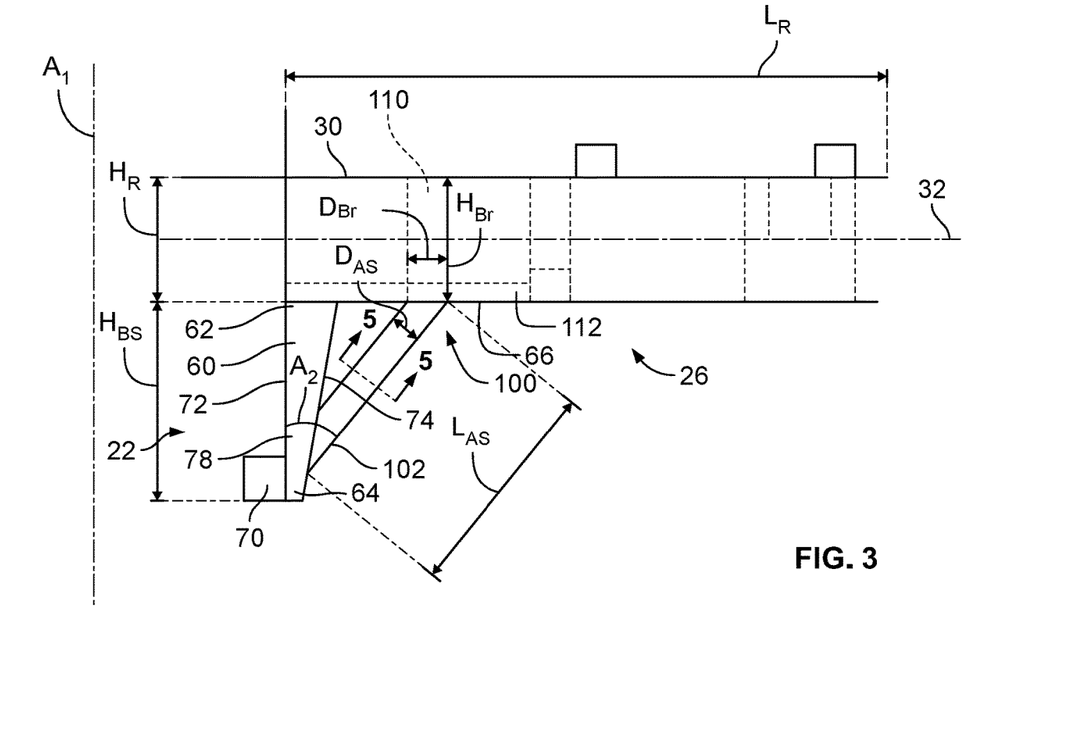
FIG. 3 is a side elevational view of the trailer frame of FIG. 2.
Figure 4:
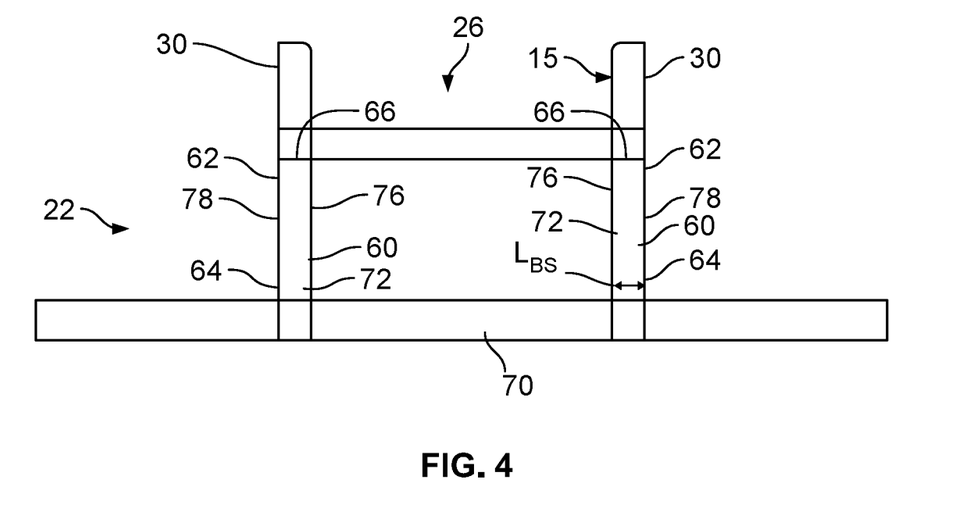
FIG. 4 is a rear elevational view of the trailer frame of FIG. 2.

As seen in FIGS. 2-4, the trailer frame 26 generally includes two base rails 30 extending along a longitudinal axis 32 of the trailer parallel to one another with a gap therebetween. Each of the two base rails 30 may be provided in substantially the same size and shape. In some embodiments, the base rails 30 have a substantially C-shaped cross-sectional profile. Each C-shaped base rail 30 includes a side strut 34 that is generally vertically oriented and parallel to the longitudinal axis 32. Each of the base rails 30 also includes top and bottom struts 36, 38 extending inwardly from top and bottom edges of the side strut 34, parallel to one another, and generally perpendicular to the side strut 34. Each of the base rails 30 also includes vertically oriented end struts 41 that are provided at opposing ends of each of the base rails 30 and act as a termination point for the base rails 30. Each of the C-shaped base rails 30 further includes an inwardly facing longitudinal cavity 40 defined by the respective side strut 34, top strut 36, bottom strut 38, and end struts 41, wherein the cavity 40 is formed by the top and bottom struts 36, 38 protruding inwardly from the side strut 34. The cavity 40 extends along a length (along the longitudinal axis 32) of each of the C-shaped base rails 30 and may be interrupted by one or more structures as discussed in further detail below.

Referring to FIGS. 2 and 3, the side strut 34 of each of the base rails 30 may be defined by a length dimension $L_R$. The length $L_R$ of the side strut 34 may be between about 0.5 meters to about 2 meters. In some embodiments, the length $L_R$ of the side strut 34 may be between about 0.5 meters to about 1.5 meters, or about 0.5 meters to 2 meters, or about 1.0 meters to about 2.0 meters. In other embodiments, the length $L_R$ of side strut 34 is about 0.6 meter, or about 1.17 meters, or about 1.22 meters. In an exemplary embodiment, the length $L_R$ of each of the side struts 34 is about 1.22 meters.

Referring again to FIGS. 2 and 3, the top and bottom struts 36, 38 of each of the base rails 30 may be defined by a depth dimension $D_R$. The depth $D_R$ of the top and bottom struts 36, 38 may be between about 2.5 millimeters and about 25 millimeters. In some embodiments, the depth $D_R$ of top and bottom struts 36, 38 is about 4.77 millimeters. In other embodiments, the Depth $D_R$ of the top and bottom struts 36, 38 is about 6.35 millimeters.

Each of the base rails 30 also may be defined by a height dimension HR. In some embodiments, each of the base rails 30 are substantially the same height. The height HR of the base rails 30 may be between about 0.1 meters to about 0.5 meters. In some embodiments, the height HR of the base rails 30 may be about 0.1 meters, or about 0.2 meters, or about 0.3 meters. In an exemplary embodiment, the height HR of the base rails 30 is about 0.3 meters. The base rails 30 may be made of any suitable material, including for example stainless steel. In some embodiments, the base rails 30 may be provided as SA240-201LN stainless steel.

Still referring to FIGS. 2-4, the trailer frame 26 may further include one or more cross members 42 that extend between, are generally perpendicular to, and have first and second ends 44, 46 coupled to the C-shaped base rails 30. In some embodiments, the cross members 42 may be coupled to a portion of the bottom strut 38 and/or the side strut 34, and/or may include one or more supports 50 that further connect the cross members 42 to the C-shaped base rails 30. The one or more cross members 42, and the supports 50, may be coupled to the C-shaped base rails 30 in manners known in the art including welding, fasteners, and other methodologies.

Still referring to FIGS. 2-4, the rear impact guard 22 generally includes first and second bumper support members 60, each having a first, or upper, end 62 and a second, or lower, end 64. The bumper support members 60 may be formed in any suitable manner, for example, the bumper support members 60 may be solid, substantially solid, or tubular (i.e., hollow). In the case where the bumper support members 60 are tubular, the bumper support members 60 may be extruded as a tube, formed into a tube from a single piece of material, or formed into a tube by two or more pieces of material that are welded together to form the tubular bumper support members 60. In some embodiments, the bumper support members 60 may be a 7-gauge, square tube. The bumper support members 60 may be made of any suitable material including steel, other alloys or metals, and other materials exhibiting the strength to limit rear impact by a vehicle contacting the trailer 20. In some instances, the bumper support members 60 may be provided as A240-201LN stainless steel.

As best seen in FIGS. 2 and 3, each bumper support member 60 is defined by four side surfaces, namely, a rear surface 72, a front surface 74 opposing the rear surface 72, an inner surface 76, and an outer surface 78. In some embodiments, the rear surface 72 and the front surface 74 may be parallel. In other embodiments, the rear surface 72 and the front surface 74 may not be parallel, for example, the rear surface 72 may be generally vertical and the front surface 74 may be angled with respect to the rear surface 72, as shown in FIG. 3. The inner and outer surfaces 76, 78 may also be parallel to one another or may optionally be non-parallel to one another. In other embodiments, the bumper support members 60 may be provided in any suitable size and/or shape.

As shown in FIG. 3, each of the bumper support members 60 may be defined by a height dimension $H_{BS}$. The height $H_{BS}$ of each of the bumper support members 60 may be between about 0.4 meters to about 1 meters, or about 0.5 meters to about 0.8 meters. In an exemplary embodiment, the height $H_{BS}$ of each of the bumper support members 60 is about 0.47 meters. The bumper support members 60 may also be defined a depth $D_{BS}$ (not shown). In some embodiments, the depth $D_{BS}$ of the bumper support members 60 may vary from the bottom to top. In other embodiments, the depth $D_{BS}$ is the same throughout the length of the bumper support members 60. The depth $D_{BS}$ of each of the bumper support members 60 may be between about 73 millimeters to about 254 millimeters. In an exemplary embodiment, the depth $D_{BS}$ of the bumper support member 60 is about 108 millimeters.

As seen in FIG. 4, the bumper support members 60 may further be defined by a length dimension $L_{BS}$. The length $L_{BS}$ of each of the bumper support members 60 may be between about 5 millimeters to about 30 millimeters. In some embodiments, the length $L_{BS}$ of the bumper support members 60 is 6.4 millimeters.

The first end 62 of each bumper support member 60 is coupled, for example, by welding, bolts, or any other suitable method to bottom surfaces 66 of the base rails 30, in particular, to the bottom struts 38. The second end 64 of each bumper support member 60 is coupled to an elongated bumper member 70 by welding, bolts, or in any other suitable manner. The bumper member 70 may be formed of any suitable material and may have any suitable shape. In some embodiments, the bumper member 70 may be hollow or partially hollow and may have a cross-sectional shape that is generally square-shaped. The bumper member 70 may be made of any suitable material, for example stainless steel. In some embodiments, the bumper member 70 may be provided as an ASTM 554-304 Square Tube. In other embodiments, the bumper member 70 may be a seven-gauge square tube.

Referring to FIG. 2, the bumper member 70 may be defined by a length dimension LB. The length LB of the bumper member 70 may be between about 1 meter to about 2.5 meters, or about 1.2 meters to about 2.3 meters. In some embodiments, the length LB of the bumper member 70 is about 2.24 meters. The bumper member 70 also may be defined by a height dimension $H_B$. The height $H_B$ of the bumper member 70 may be between about 25 millimeters to about 254 millimeters. In some embodiments, the height $H_B$ of the bumper member 70 is 101.6 millimeters. The bumper member 70 may further be defined by a depth dimension $D_B$. The depth $D_B$ of the bumper member 70 may be about 2.5 millimeters and 25 millimeters. In some embodiments, the bumper member 70 is about 4.55 millimeters.

Referring to FIGS. 2 and 3, the rear impact guard 22 further includes a support system 100 that may provide additional impact resistance to the rear impact guard 22. More particularly, the rear impact guard 22 and the support system 100 may operate to absorb energy of rear impact from another vehicle and may aid in preventing other vehicles from traveling beyond a rear extremity of the trailer 20 into an area beneath the trailer frame 26 in a rear-impact collision. The support system 100 includes at least two angled supports 102 extending between the bumper support members 60 and the bottom surfaces 66 of the respective C-shaped base rails 30 forwardly of where the bumper support members 60 are coupled to the C-shaped base rails 30. The angled supports 102 may be coupled to the bumper support members 60 at a first attachment point and may be coupled to the bottom surfaces 66 of the respective C-shaped base rails 30 at a second attachment point. In some embodiments, the first attachment point is located at, or adjacent to, the second end 64 of the bumper support members 60.

In some instances, the support system 100 includes an equal number of angled supports 102 extending between each of the bumper support members 60, and the bottom surfaces 66, on both sides of the respective C-shaped base rails 30. In some embodiments, the support system 100 includes two angled supports 102, one each associated with the respective bumper support member 60, as shown in FIG. 2. In other embodiments, the support system 100 includes at least two angled supports on each side of the rear impact guard 22. Each pair of angled supports are generally provided in parallel to each other, or having substantially the same angle relative to the base rails 30, and extending between the bumper support members 60 and the bottom surface 66 of the respective C-shaped base rails 30. In other embodiments, the support system 100 includes more than two angled supports 102 on each side of the rear impact guard 22. In some embodiments, the support system 100 may include a first, second, third and fourth angled supports 102. The angled support 102 may be made of any suitable material, for example SA2490201LN stainless steel.

In some embodiments, each angled support 102 is coupled to a respective bumper support member 60 and the bottom surface 66 of the respective C-shaped base rails 30 by welding, bolts, or in any other suitable manner. In some embodiments, the angled support 102 may be coupled to the bumper support member 60 adjacent the second end 64 of the bumper support member 60 or spaced from the bottom end of the bumper support member 60. In some embodiments, each of the angled supports 102 are coupled at a first end to the respective bumper support members 60 and coupled to the bottom surface of the base rails 30, forwardly of the bumper support members 60 and forming a substantially hollow triangular member. In some embodiments, multiple angled support 102 are coupled to a single bumper support member 60, on each side of the rear impact guard 22. In other embodiments, multiple angled support 102 are each coupled to a bumper support member 60, resulting in multiple angled support 102 and multiple bumper support members 60. In some embodiments, at least two angled support 102 are designed to be coupled at first ends to each of the first and second bumper support members 60, respectively, and are coupled at second ends to each of the first and second base rails 30, respectively. The first and second bumper support members 60 and the at least two angled support 102 define a substantially triangular body with an opening therein. Regardless of its location, the angled support 102 may provide added impact resistance and/or protection against a vehicle riding under the rear of the trailer.

In some embodiments, the angled support 102 may be positioned at an angle A2. The angle may be calculated with respect to the bumper support members 60. The angle A2 may be about 15 degrees and about 50 degrees with respect to an outer edge of the bumper support members 60, and parallel to a vertical axis A1. In some embodiments, the angle A2 may be about 15 degrees to about 40 degrees. In some embodiments, the angle A2 is about 15, or about 38 degrees. In other embodiments, one or more of the angled supports 102 may be positioned at an angle A2 of about 38 degrees with respect to the vertical axis A1. In some embodiments, multiple angled supports 102 are positioned on each side of the trailer frame 26. In some instances, each angled support is positioned at a substantially similar angle relative to the each other(s).

As seen in FIGS. 2 and 3, the angled support 102 may be defined by a length dimension $L_{AS}$. The length $L_{AS}$ of the angled support 102 may be between about 0.1 meters and about 1 meter. In some embodiments, the length $L_{AS}$ of the angled support 102 is about 0.51 meters. The angled supports 102 also may be defined by a depth $D_{AS}$. The depth $D_{AS}$ of the angled support member may be between about 2 millimeters to about 5 millimeters. In some embodiments, the depth $D_{AS}$ of the angled member is about 4.75 millimeters.

Figure 5:
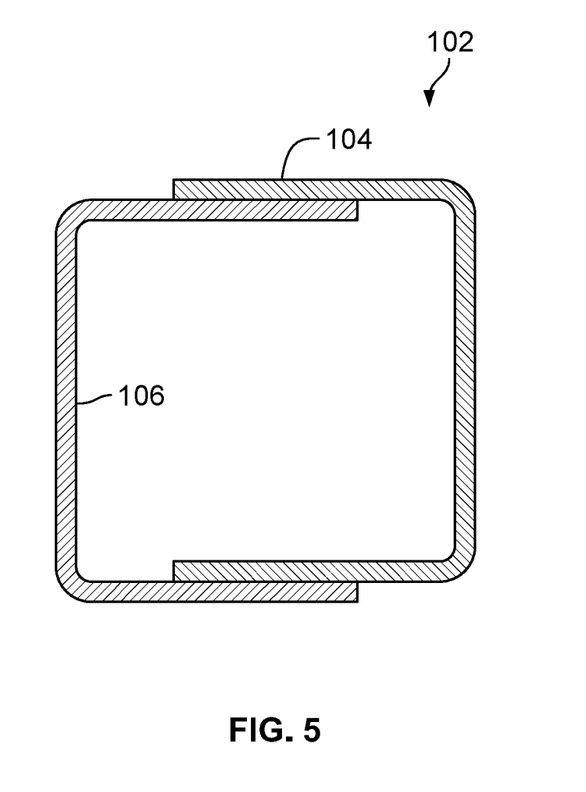
FIG. 5 is a cross-sectional view taken generally along the lines 5-5 of FIG. 3 and generally showing a cross-sectional view of an angled support of a support system of the rear impact guard of FIGS. 2-4.

As seen in FIG. 5, each angled support 102 may be substantially hollow and may be formed from first and second C-shape members 104, 106 welded or otherwise coupled to one another. In some embodiments, the C-shape members 104, 106 may be provided as tubes (e.g., 7-gauge square tubes). In other embodiments, the angled supports 102 may be formed of a single, hollow piece of material or of any other suitable number of pieces of material. In still other embodiments, the angled supports may be solid. The C-shape members 104, 106 and/or the angled supports 102 may be made of any suitable material, for example SA2490201LN stainless steel. Additionally, while the angled supports 102 are shown as having a substantially square cross-sectional shape, any other suitable cross-sectional shape may be utilized.

Referring again to FIGS. 2 and 3, the support system 100 further includes anti-buckling braces 110 positioned within the inwardly facing cavity 40 of each of the C-shaped base rails 30. The braces 110 may be provided as a solid material or, may be partially hollow, or may be hollow. In embodiments where the braces 110 are hollow, the braces 110 may be formed of one or more C-shaped brackets or may be formed of a hollow tube made of one or more pieces of material. In other embodiments, the braces 110 may be provided as one or more plates that are connected to each other and the C-shaped base rails 30. In some embodiments, the braces 110 may be formed of any suitable materials that provides the anti-buckling properties, for example SA240-210LN stainless steel.

The braces 110 may be defined by a height dimension $H_Br$. The height $H_Br$ of the braces 110 may be between 0.25 meters and 1 meter. In some embodiments, the height $H_Br$ of the braces 110 may be about 0.3 meter. The braces 110 may be further defined by a depth dimension $D_Br$. In some embodiments, the depth $D_Br$ of the braces 110 may be between about 2 millimeters to about 5 millimeters. In some embodiments, the depth $D_Br$ of the braces 110 may be about 4.75 millimeters. In some embodiments, the depth $D_Br$ of the braces 110 may be the same as the depth $D_{AS}$ of the angled support 102.

The support system 100 may include at least two braces 110. In some embodiments, the support systems 100 may include an equal number of braces 110 as angled supports 102. Each of the braces 110 may be located along a length of the respective C-shaped base rails 30 immediately adjacent and above the second attachment point where the angled support 102 is coupled to the C-shaped base rail 30. In other words, the braces 110 are positioned with bottom ends thereof aligned with top ends of the respective angled supports 102. In this manner, the braces 110 may decrease compaction or buckling of the C-shaped base rail 30 upon collision of a vehicle with the rear impact guard 22. More particularly, if a vehicle impacts the rear impact guard 22, for example, at or slightly above the bumper member 70, one or more of the bumper member 70, the bumper support members 60, and the angled supports 102 may be pushed forwardly, which may cause rotation of one or more of the bumper member 70, the bumper support members 60, and the angled supports 102 about the first attachment point of the bumper support member(s) 60, thereby causing upward or rotational movement of the angled support(s) 102.

The braces 110 may decrease the force exerted on the C-shaped base rails 30 by the angled supports 102, which may decrease the likelihood of compaction or buckling of the C-shaped base rails 30. In some embodiments, one or more dimensions of the braces 110 may be sized to correspond to one or more dimensions of the angled supports 102. In other embodiments, the depth of the braces 110 may be greater than or less than the depth of the angled supports 102. In some embodiments, one or more of the braces 110 may only partially overlap the respective angled support 102 (i.e., along lengths of the braces 110 and the angled supports 102). In some instances, at least a portion of the footprint of the braces 110 at least partially overlap a portion of the respective angled supports 102. The braces 110 may be spaced from one another along the width of the trailer. In some embodiments, spacing of the braces 110 aligns with the spacing of a top portion of the angled supports 102. This results in an alignment of the second attachment point between the braces 110 and the angled supports 102 and enhances the anti-buckling properties of the support system 100.

Referring again to FIG. 3, in some embodiments, the support system 100 may further include an L-shaped bracket 112 positioned within each C-shaped base rail 30 to provide additional support to the C-shaped base rails 30. The L-shaped bracket 112 may be configured to provide reinforcement to the base rails 30 and may be positioned within the base rails 30 in any number of configurations. The L-shaped bracket 112 is substantially similar to the L-shaped brackets 202 and/or 210 described hereinbelow in connection with FIGS. 7 and 8.

In some embodiments, the rear impact guard 22 may be attached to a trailer 20 by first welding, bolting, or otherwise attaching the bumper support members 60 to the respective C-shaped base rails 30, welding, bolting, or otherwise attaching the bumper member 70 to the bumper support members 60, welding, bolting, or otherwise attaching the angled supports 102 to the bumper support members 60 and the C-shaped base rails 30, and welding, bolting, or otherwise attaching the braces 110 to the C-shaped base rails 30.

In other embodiments, one or more of the bumper support members 60, the bumper member 70, the angled supports 102, and the braces 110 may be retrofit to an existing rear impact guard to form the rear impact guard 22 of FIGS. 2-4. More particularly, in some embodiments, a trailer 20 may originally only include the bumper support members 60 and the bumper member 70. In this manner, the angled supports 102 and the braces 110 may be attached to the existing rear impact guard and trailer frame 26 after initial production of the trailer 20. For example, the angled supports 102 may be welded, bolted, or otherwise attached to the respective bumper support members 60 and C-shaped base rails 30 and the braces 110 may be welded, bolted, or otherwise attached to the respective C-shaped base rails 30, as described in detail above.

A method of retrofitting a rear impact guard coupled to a rear end of a vehicle is also provided. The first and second bumper support members are configured to be coupled to first and second base rails of the vehicle and a horizontal bumper is designed to be mounted to lower ends of the first and second bumper support members. The method includes the steps of coupling first ends of first and second angled support members to the first and second bumper support members, respectively, and coupling second ends of first and second angled support members to the first and second base rails of the vehicle to form a triangular support having an opening therein, and coupling first and second braces to the first and second base rails, wherein at least a portion of each of the first and second braces is located above the second ends of respective angled supports.

Figure 6:
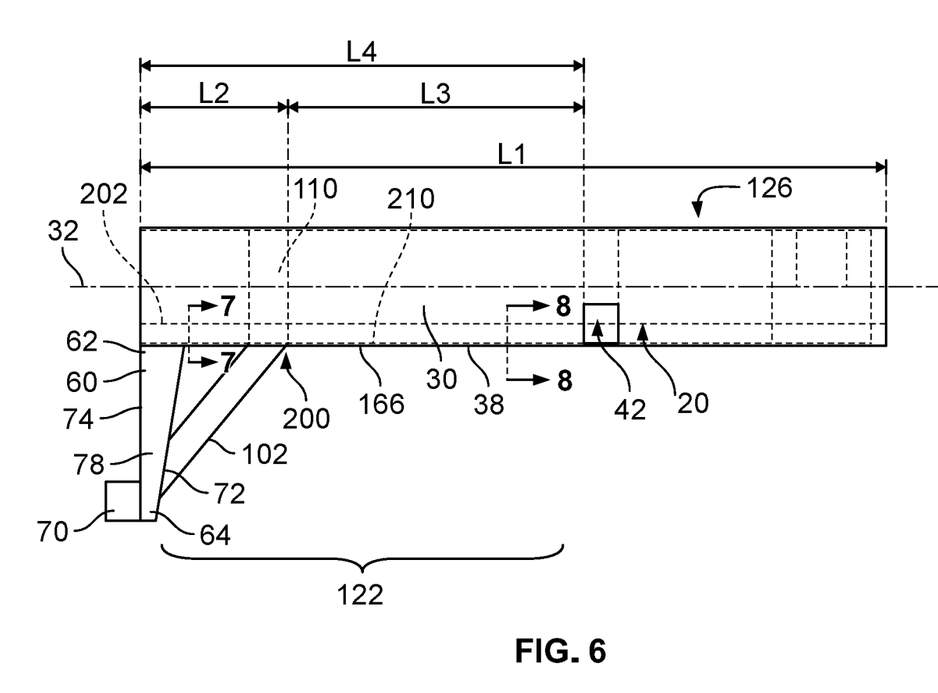
FIG. 6 is a side elevational view of a further trailer frame, for example, for a tank trailer similar to the tank trailer of FIG. 1, the trailer frame including a second embodiment of a rear impact guard with a support system coupled thereto.

A further trailer frame 126 is depicted in FIG. 6, wherein the trailer frame 126 has a length dimension L1 that is greater than a length of the trailer frame 26 depicted with respect to FIGS. 2-4. In some embodiments, the length dimension L1 is about 2 meters. Similar to the embodiment of FIGS. 2-4, a second embodiment of a rear impact guard 122 is coupled to and depends downwardly from rear, bottom surfaces 166 of the trailer frame 126. The trailer frame 126 similarly includes the C-shaped base rails 30 extending along a longitudinal axis 32 of the trailer parallel to one another and may include one or more cross members 42. The C-shaped base rails 30 and the cross members 42 are identical to those described above with respect to FIGS. 2-4 and, thus, will not be described in detail.

A number of components of the rear impact guard 122 are similar to components of the rear impact guard 22 of the embodiment of FIGS. 2-4 and, therefore, the same reference numbers will be used for such components. The rear impact guard 122 generally includes first and second bumper support members 60 each having a first end 62 and a second end 64. The bumper support members 60 may be formed in any suitable manner, for example, the bumper support members 60 may be solid, substantially solid, or tubular (i.e., hollow). In the case where the bumper support members 60 are tubular, the bumper support members 60 may be formed of a single piece of material, or two or more pieces of material that are welded together to form tubular bumper support members 60. Each bumper support member 60 is formed with four side surfaces, namely, a rear surface 72, a front surface 74, an inner surface (not shown), and an outer surface 78. In some embodiments, the rear surface 72 and the front surface 74 may be parallel. In other embodiments, the rear surface 72 and the front surface 74 may not be parallel, for example, the rear surface 72 may be generally vertical and the front surface may be angled with respect to the rear surface 72. The inner and outer surfaces 76, 78 may also be parallel to one another or may optionally be non-parallel to one another. In other embodiments, the bumper support members 60 may have any suitable size and/or shape.

The first end 62 of each bumper support member 60 is coupled, for example, by welding, bolts, or any other suitable method to bottom surfaces 166 of the C-shaped base rails 30, in particular, the bottom struts 38. The second end 64 of each bumper support member 60 is coupled to the second end 64 of a bumper member 70 by welding, bolts, or in any other suitable manner. The bumper member 70 may be formed of any suitable material and may have any suitable shape. In some embodiments, the bumper member 70 may have a cross-sectional shape that is generally square-shaped.

Still referring to FIG. 6, the rear impact guard 122 further includes a support system 200 to better provide impact resistance to the rear impact guard 22. More particularly, the rear impact guard 122 and the support system 200 may operate to absorb energy of rear impact from another vehicle and may aid in preventing other vehicles from traveling beyond a rear extremity of the trailer into an area beneath the frame in a rear-impact collision. The support system 200 includes at least two angled supports 102 extending between the bumper support members 60 and the bottom surfaces 166 of the respective C-shaped base rails 30 forwardly of where the bumper support members 60 are coupled to the C-shaped base rails 30. The angled supports 102 are identical to the angled supports described above and, thus, may have any of the features described above. The support system 200 further includes braces 110 positioned within the inwardly facing cavity 40 of each of the C-shaped base rails 30. The braces 110 are identical to the braces described above and therefore, may be placed in the same position(s) as described above and/or may have any of the features described above.

Figure 7:
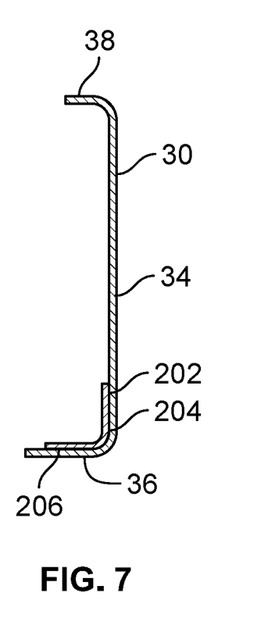
FIG. 7 is a cross-sectional view taken generally along the lines 7-7 of FIG. 6 and depicting a first L-shaped bracket attached to a first portion of the trailer frame of FIG. 6.

The differences between the rear impact guard 22 of FIGS. 2-4 and the rear impact guard 122 of FIG. 6 will now be described in detail. More particularly, as the length L1 of the trailer frame 126 is greater than the length of the trailer frame 26 of FIGS. 2-4, the rear impact guard 122 may include additional features as part of the support system 200 to account for the greater length. As seen in FIGS. 6 and 7, a first L-shaped bracket 202 may be positioned within each of the C-shaped base rails 30 with a first segment 204 adjacent the side strut 34 and a second segment 206 adjacent the bottom strut 36. In some embodiments, the first L-shaped bracket 202 extends along an entirety of the respective C-shaped base rails 30. In other embodiments, the first L-shaped bracket 202 extends a length L4 (e.g., between a rear end of the trailer frame 126 and a rear end of a first cross member 42) along the respective C-shaped base rails 30. In this manner, the first L-shaped bracket 202 provide support to the lower portion of each C-shaped base rail 30.

Figure 8:
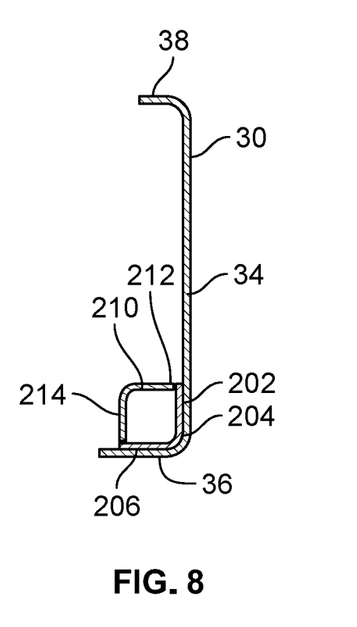
FIG. 8 is a cross-sectional view taken generally along the lines 8-8 of FIG. 6 and depicting the first and a second L-shaped bracket attached to a second portion of the trailer frame of FIG. 6.

Referring to FIGS. 6 and 8, a second L-shaped bracket 210 may also be positioned within each of the C-shaped base rails 30 with an end of a first segment 212 of the second L-shaped bracket 210 adjacent an end of the first segment 204 of the first L-shaped bracket 202 and an end of a second segment 214 of the second L-shaped bracket 210 adjacent an end of the second segment 206 of the first L-shaped bracket 202. In some embodiments, the L-shaped brackets 202, 210 are oriented such that the first segment 212 of the second L-shaped bracket 210 is parallel to and spaced from the second segment 206 of the first L-shaped bracket 202 and the second segment 214 of the second L-shaped bracket 210 is parallel to and spaced from the first segment 204 of the first L-shaped bracket 202, thereby forming a generally hollow substantially square, tube-shaped bracket. In some embodiments, the bracket 210 depicted in FIG. 8 may be provided as a substantially square, tubular, hollow member.

The second L-shaped bracket 210 may have a length L3 (e.g., between a front end of each brace 110 and a rear end of the first cross member 42) such that additional support is added to the C-shaped base rails 30 forwardly of where the angled supports 102 are attached to the C-shaped base rails 30. In other embodiments, the second L-shaped bracket 210 may extend from the angled supports to a forward end of the trailer frame 126. Referring again to FIG. 6, in some embodiments, a single bracket is utilized for the length L2 and two brackets (or a substantially square tubular member) are utilized for the length L3 to add support to the C-shaped base rails 30 to potentially reduce compaction or buckling of the C-shaped base rails 30 and/or other components of the trailer frame 126.

In some embodiments, the rear impact guard 122 may be attached to a trailer 20 by first welding, bolting, or otherwise attaching the bumper support members 60 to the respective C-shaped base rails 30, welding, bolting, or otherwise attaching the bumper member 70 to the bumper support members 60, welding, bolting, or otherwise attaching the angled supports 102 to the bumper support members 60 and the C-shaped base rails 30, welding, bolting, or otherwise attaching the braces 110 to the C-shaped base rails 30, and welding, bolting, or otherwise attaching the L-shaped brackets 202, 210 to the C-shaped base rails 30 and/or each other.

In other embodiments, one or more of the bumper support members 60, the bumper member 70, the angled supports 102, the braces 110, and/or the L-shaped brackets 202, 210 may be retrofit to an original rear impact guard to form the rear impact guard 122 of FIG. 6. More particularly, in some embodiments, a trailer may originally only include the bumper support members 60 and the bumper member 70. In this manner, the angled supports 102, the braces 110, and/or the L-shaped brackets may be attached to the existing rear impact guard 122 and trailer frame 126 after initial production of the trailer. For example, the angled supports 102 may be welded, bolted, or otherwise attached to the respective bumper support members 60 and the C-shaped base rails 30, the braces 110 may be welded, bolted, or otherwise attached to the respective C-shaped base rails 30, and the L-shaped brackets 202, 210 may be welded, bolted, or otherwise attached to the C-shaped base rails 30 and/or each other, as described in detail above.

While the rear impact guards of the present disclosure are shown as being coupled to a particular trailer, for example, a tank trailer, any of the rear impact guards as disclosed herein may be coupled to truck bodies, dry van or refrigerated trailers, refrigerated dry vans, flat beds, tanks, or any other vehicles.

While two C-shaped base rails, two bumper support members, two angled supports, and two braces are depicted in the disclosed embodiments, it is well within the scope of the present disclosure to include any suitable number of one or more of such components. In illustrative embodiments, a trailer frame may include two C-shaped base rails and four sets of bumper support members and angled supports (e.g., with two angled supports attached to the C-shaped base rails). Any other suitable number or combination of different elements may be utilized. Further, any of the features of any of the embodiments disclosed herein may be utilized with regard to any of the other embodiments disclosed herein.

While the trailer frames disclosed herein are disclosed as having base rails that are generally C-shaped, it should be understood that the principles of the present disclosure may be utilized with base rails of different shapes, for example, I-beams or base rails of any other suitable shape.

While rear impact guards are generally utilized to prevent other vehicles in a rear-impact collision with such a trailer from traveling beyond the rear extremity of the trailer and into an area beneath the floor assembly of the trailer, it is also possible that the rear impact guards disclosed herein may improve aerodynamics.

While the individual parts of the invention have been described separately and in the manner in which they are assembled on a trailer vehicle, it is understood that the individual parts can be sold as a kit that can be conveniently retrofitted on a trailer vehicle. That is, each individual part is adapted in use to be assembled with other individual parts and/or with the trailer bed vehicle. In some instances, the kit may comprise at least two angled support 102, at least two braces 110, and at least two C-shape members 104, 106 that are sold as part of a retrofit kit. The kit may further comprise two C-shaped base rails 30 and two bumper support members 60. It is well within the scope of the present disclosure to include any suitable number of one or more of such components. Any other suitable number or combination of different elements may be utilized. Further, any of the features of any of the embodiments disclosed herein may be utilized with regard to any component of the kit.

As noted above, the rear impact guards of the present disclosure are designed to prevent other vehicles in a rear-impact collision with such a trailer from traveling beyond the rear extremity of the trailer and into an area beneath the floor assembly of the trailer. There are various regulations aimed at increasing the safety of trailers. The designs presented herein are intended to meet existing strength requirements set by both the National Highway Traffic Safety Administration (NHTSA) and the Canadian Transportation Equipment Association (CTEA).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A rear impact guard configured to be coupled to a rear end of a vehicle, comprising:
first and second bumper support members configured to be coupled to first and second base rails of the vehicle, wherein the first and second bumper support members are spaced from one another along a width of the vehicle;
a horizontal bumper mounted to lower ends of the first and second bumper support members;
first and second angled support members coupled at first ends to the first and second bumper support members and coupled at second ends to the first and second base rails forwardly of the first and second bumper support members and forming a substantially hollow triangular member; and
first and second braces positioned within the first and second base rails and coupled thereto, wherein at least a portion of each of the first and second braces is located above the second ends of the first and second angled supports.

2. The rear impact guard of claim 1, further including:
first and second brackets coupled to and extending along first lengths of the first and second base rails;
third and fourth brackets coupled to and extending along second lengths of the first and second base rails; and
wherein the first lengths and second lengths are different.

3. The rear impact guard of claim 2, wherein the first lengths are greater than the second lengths and the second lengths completely overlap the first lengths.

4. The rear impact guard of claim 1, wherein the first and second base rails are C-shaped and include first and second side struts, first and second top struts coupled to and extending inwardly from first ends of the first and second side struts, first and second bottoms struts coupled to and extending inwardly from second ends of the first and second side struts, and first and second inwardly-facing cavities formed by the first and second side struts, top, and bottom struts.

5. The rear impact guard of claim 4, wherein the first and second braces are coupled to the first and second base rails within the first and second inwardly-facing cavities.

6. The rear impact guard of claim 1, further comprising a third angled support member coupled at a first end to the first bumper support member and coupled at a second end to the first base rail; and
a fourth angled support member coupled at a first end to the second bumper support member and coupled at a second end to the second base rail.

7. The rear impact guard of claim 6, wherein the first angled support member and the third angled support member are coupled to the first bumper support member and the first base rail at substantially similar angles.

8. The rear impact guard of claim 6, wherein the first angled support member and the third angled support member are parallel to one another.

9. The rear impact guard of claim 6, wherein the second angled support member and the fourth angled support member are coupled to the second bumper support member and the second base rail at substantially similar angles.

10. The rear impact guard of claim 6, wherein the second angled support member and the fourth angled support member are parallel to one another.

11. A kit for retrofitting a vehicle, the kit including various components of a rear impact guard configured to be coupled to a frame adjacent a rear end of a vehicle, the kit comprising:
first and second bumper support members designed to be coupled to ends of first and second base rails of the vehicle;
a horizontal bumper designed to be mounted to lower ends of the first and second bumper support members;
at least two angled support members designed to be coupled at first ends to each of the first and second bumper support members, respectively, and coupled at second ends to each of the first and second base rails, respectively, the first and second bumper support members and the at least two angled support members defining a substantially triangular body with an opening therein; and
a plurality of braces designed to be positioned within the first and second base rails and coupled thereto, wherein at least a portion of the plurality of braces is located above the second ends of the two angled support members.

12. The kit of claim 11, wherein the at least two angled support members are hollow.

13. The kit of claim 11, wherein the at least two angled support members are parallel to one another.

14. The kit of claim 11, wherein the at least two angled support members are positioned at an angle of between about 15 degrees and about 50 degrees with respect to an axis defined by a rear face of the frame.

15. The kit of claim 11, further including at least two additional angled support members.

16. The kit of claim 11, wherein the first and second base rails are C-shaped and include first and second side struts, first and second top struts coupled to and extending inwardly from first ends of the first and second side struts, first and second bottoms struts coupled to and extending inwardly from second ends of the first and second side struts, and first and second inwardly-facing cavities formed by the first and second side struts, top, and bottom struts.

17. The kit of claim 16, wherein the plurality of braces are designed to be positioned within the first and second inwardly-facing cavities.

18. A method of retrofitting a vehicle with a rear impact guard, the vehicle including pre-existing first and second bumper support members coupled to first and second base rails of the vehicle and a horizontal bumper mounted to lower ends of the pre-existing first and second bumper support members, the method comprising the steps of:
coupling first ends of first and second angled support members to the pre-existing first and second bumper support members, respectively;
coupling second ends of first and second angled support members to the first and second base rails of the vehicle, respectively, to form a triangular support having an opening therein; and
coupling first and second braces to the first and second base rails, wherein at least a portion of each of the first and second braces is located above the second ends of respective angled supports.

19. The method of claim 18, further comprising the steps of:
coupling first and second brackets to the first and second base rails along a first length of each of the first and second base rails; and
coupling third and fourth brackets to the first and second base rails along a second length of each of the first and second base rails, the second length of each of the first and second base rails being less than the first length of each of the first and second base rails.

20. The method of claim 18, further comprising the step of coupling a bumper member to the first and second bumper support members.

* * * * *